United States Patent
Brown et al.

(10) Patent No.: US 9,838,657 B2
(45) Date of Patent: Dec. 5, 2017

(54) PROJECTION ENHANCEMENT SYSTEM

(71) Applicant: International Business Machines Corporation, Armonk, NY (US)

(72) Inventors: Michael Sean Brown, Wahroonga (AU); Stefan Harrer, Hampton (AU); Christopher J. Pavlovski, Lower Beechmont (AU); Laurence J. Plant, North Balwyn (AU)

(73) Assignee: International Business Machines Coporation, Armonk, NY (US)

( * ) Notice: Subject to any disclaimer, the term of this patent is extended or adjusted under 35 U.S.C. 154(b) by 0 days.

(21) Appl. No.: 14/990,151

(22) Filed: Jan. 7, 2016

(65) Prior Publication Data

US 2017/0201731 A1     Jul. 13, 2017

(51) Int. Cl.
*G03B 21/00* (2006.01)
*H04N 9/31* (2006.01)
*G06T 5/00* (2006.01)

(52) U.S. Cl.
CPC ........... *H04N 9/3185* (2013.01); *G06T 5/004* (2013.01); *H04N 9/3147* (2013.01); *G06T 2207/30196* (2013.01)

(58) Field of Classification Search
CPC ....................................................... G03B 21/26
See application file for complete search history.

(56) References Cited

U.S. PATENT DOCUMENTS

| | | | | |
|---|---|---|---|---|
| 8,290,208 B2* | 10/2012 | Kurtz | ................. | G06K 9/00228 382/103 |
| 2003/0128337 A1* | 7/2003 | Jaynes | ................... | G03B 21/26 353/30 |
| 2009/0190046 A1* | 7/2009 | Kreiner | ............... | H04N 9/3182 348/789 |
| 2010/0177929 A1* | 7/2010 | Kurtz | ................. | G06K 9/00228 382/103 |
| 2013/0194554 A1* | 8/2013 | Aruga | .................. | G03B 21/147 353/69 |
| 2015/0268730 A1* | 9/2015 | Walline | ................... | G06F 3/017 345/168 |

* cited by examiner

*Primary Examiner* — Michael Lee
*Assistant Examiner* — Humam Satti
(74) *Attorney, Agent, or Firm* — Hoffman Warnick LLC

(57) ABSTRACT

A system, method and program product that provides projection enhancement. A system is described that includes: a digital projector for generating an image projection onto a surface; a spatial sensor configured to sense and locate a blocking object in a light field associated with the digital projector; a masking system that masks a portion of the image projection corresponding to the blocking object; and an enhancement system that generates an enhancement projection onto the blocking object.

9 Claims, 3 Drawing Sheets

PROJECTION ENHANCEMENT SYSTEM

TECHNICAL FIELD

The subject matter of this invention relates to digital projections, and more particularly to a system and method of enhancing projections when blocking objects are detected in the light field of a projection.

BACKGROUND

Digital projections, including LCD (liquid crystal display), TFT (thin film transistor), DLP (digital light processing) and LCOS (liquid crystal on silicon), remain a staple for providing visual presentations to an audience. Currently, presentations are typically done with a digital projector that utilizes a shining light to project image data onto a surface such as a screen. The presenter generally stands beside, or in front of the screen and talks. This can become awkward when the speaker wants to take center stage, and walks into the projector's beam of light. Moving in front of the light can cause the speaker to squint due to the bright light, cause a distracting color pattern on his or her body, and a shadow on the screen image.

Various attempts have been made to address this problem, including the use of a mask such as that disclosed in U.S. Pat. No. 8,573,786 issued to Lin et al. on Nov. 5, 2013, and the use of multiple projectors such as that disclosed in U.S. Pat. No. 7,907,790 issued to Inazumi on Mar. 15, 2011, both of which are hereby incorporated by reference. However, the prior art fails to provide a comprehensive solution that enhances both the images being displayed and the individual making the presentation.

SUMMARY

The present disclosure addresses the problem of image obstruction by detecting blocking objects (e.g., people and other items) moving in front of, or near the projected image and modifying the projected image accordingly to mask out areas corresponding with such interferences. Additionally, detected blocking objects may receive a secondary or enhanced projection to more naturally blend with the image projection.

A first aspect provides a projection enhancement infrastructure, comprising: a digital projector for generating an image projection onto a surface; a spatial sensor configured to sense and locate a blocking object in a light field associated with the digital projector; a masking system that masks a portion of the image projection corresponding to the blocking object; and an enhancement system that generates an enhancement projection onto the blocking object.

A second aspect provides a computer program product stored on computer readable storage medium, which when executed by a computer system, provides projection enhancement, comprising: programming instructions configured to analyze input from a spatial sensor to locate a blocking object in a light field associated with an image projection of a digital projector; programming instructions that mask a portion of the image projection corresponding to the blocking object; and programming instructions that determine an enhancement projection for generation onto the blocking object.

A third aspect provides a method of implementing projection enhancement, comprising: providing a digital projector for generating an image projection onto a surface from; utilizing a spatial sensor to sense and locate a blocking object in a light field associated with the digital projector; masking a portion of the image projection corresponding to the blocking object; and generating an enhancement projection onto the blocking object.

BRIEF DESCRIPTION OF THE DRAWINGS

These and other features of this invention will be more readily understood from the following detailed description of the various aspects of the invention taken in conjunction with the accompanying drawings in which.

Figure 1:
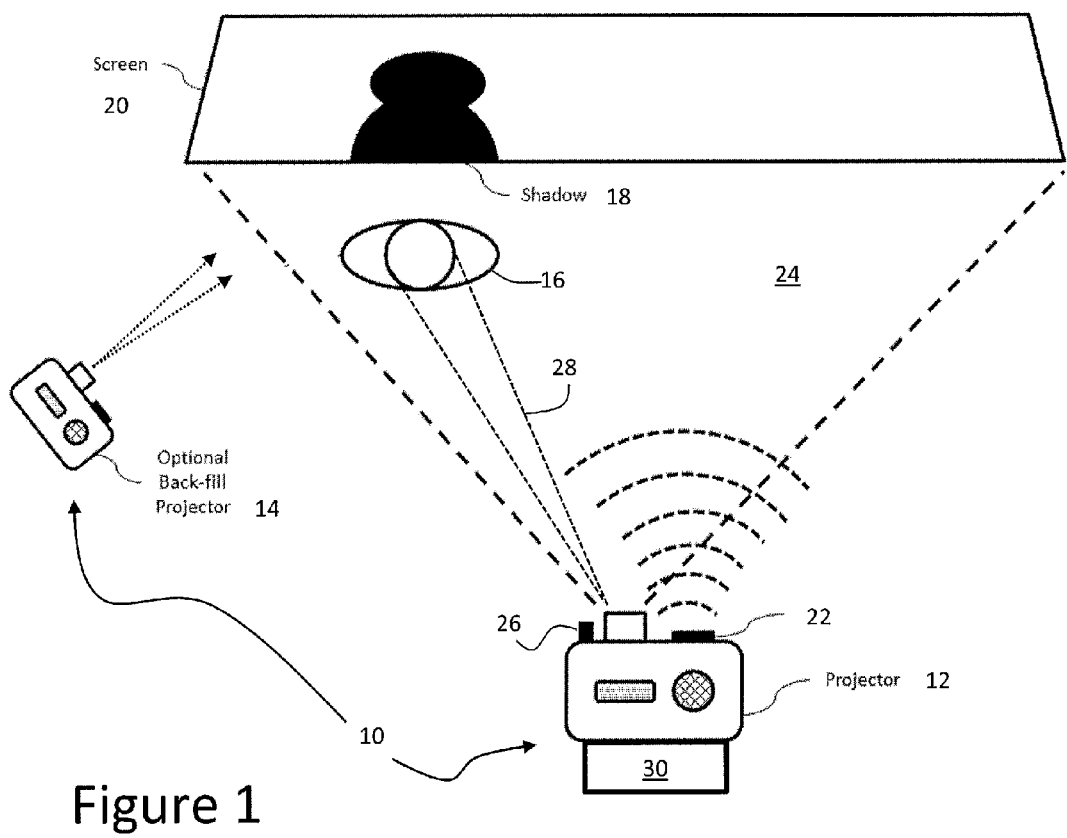
FIG. 1 shows a projection enhancement infrastructure according to embodiments.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Referring now to the drawings, FIG. 1 depicts a projection system that provides a projection enhancement infrastructure 10. Projection enhancement infrastructure 10 addresses issues arising when objects interfere with a projection by masking corresponding regions of a projection and providing enhancement to the object's appearance. As shown, primary projector 12 includes features typically found on a digital projector, e.g., a mechanism for receiving image data, a lighting source for projecting image data via a light field 24 onto a screen 20 (or other surface), etc. As noted, one of the challenges with such devices is that when a presenter 16 (or other blocking object) moves into the light field 24, a shadow 18 is created on the screen 20. In addition to interfering with the information being displayed, the presenter 16 must deal with a bright light being directed in his or her face.

In order to address this, projector 12 includes a proximity sensor 22 that senses the location of the presenter 16 (or other blocking object) and digitally masks out a corresponding part of projected image to eliminate the shadow 18 and bright light. Accordingly, the projector 12 avoids displaying the original projected image in an area where the presenter 16 is detected.

Because a portion of the light field 24 is masked, an area on the screen 20 corresponding to shadow 18 will not include projected image date (or a shadow) thus resulting in a blanked-out surface region. An optional back-fill projector 14 may be utilized to selectively back-fill the blanked-out surface region on screen 20. For example, a projection enhancement system 30 may be utilized to determine which portion of the image to mask, then send the corresponding image information associated with the masked portion to the back-fill projector 14. The back-fill projector 14 will then fill in the blanked-out surface region on the screen with the image data originally masked out by the primary projector 12. Note that the back-fill projector 14 may be placed at any angle or location to avoid typical movements of the presenter 16. Depending on the implementation, multiple back-fill projectors 14 may be utilized to guarantee access to the blanked-out surface region. In a further embodiment, a back-fill projector 14 may be automated to move from one location to another. In still another embodiment, back-fill projector 14 may be implemented with a mobile device (e.g., a smart phone) that incorporates a projector, which the presenter can hold or appropriately position proximate the screen 20.

Moreover, when utilizing a back-fill projector 14 situated at a different angle, any blank-out regions can be filled with automatically generated image data, such as a generated complimentary image in which the original image is scaled/warped to fit the required pattern.

In addition to correcting for projection interferences as described above, projection system 10 also provides object enhancement. In one embodiment, projector 12 includes an image recognition system 26 and a facility for generating a secondary or enhancement projection 28. Image recognition system 26 for example collects images of the presenter 16 or other blocking object (e.g., captured with a camera) to determine feature data that can be used to ascertain an identity, type, category, etc., of the blocking object in the light field 24. For example, the blocking object may comprise a person, a prop, a device, an animal, etc. Depending on the type of object, an enhancement projection 28 is used to separately illuminate and/or enhance the blocking object. The illumination or enhancement may include simple or more complex components. For example, if the image recognition system 26 detects a person and associated facial features, a low intensity, flattering, soft, neutral color could be projected on the presenter's face, while more robust illuminating colors could be projected on the presenter's body. If an identity of a person is recognized, a predetermined light scheme may be generated specifically for that person.

In the case where the blocking object is a prop, specialized lighting or secondary image data could be shown on the prop to highlight it. For instance, if the prop is recognized as a whiteboard or secondary screen, it can be filled with distinct image information, such as a photograph, movie, or other presentation data. If a demonstration item is recognized, a high intensity light may be projected thereon. Accordingly, any scheme and/or type of projection may be used to enhance blocking objects that is distinct from the primary or original image projection.

Figure 2:
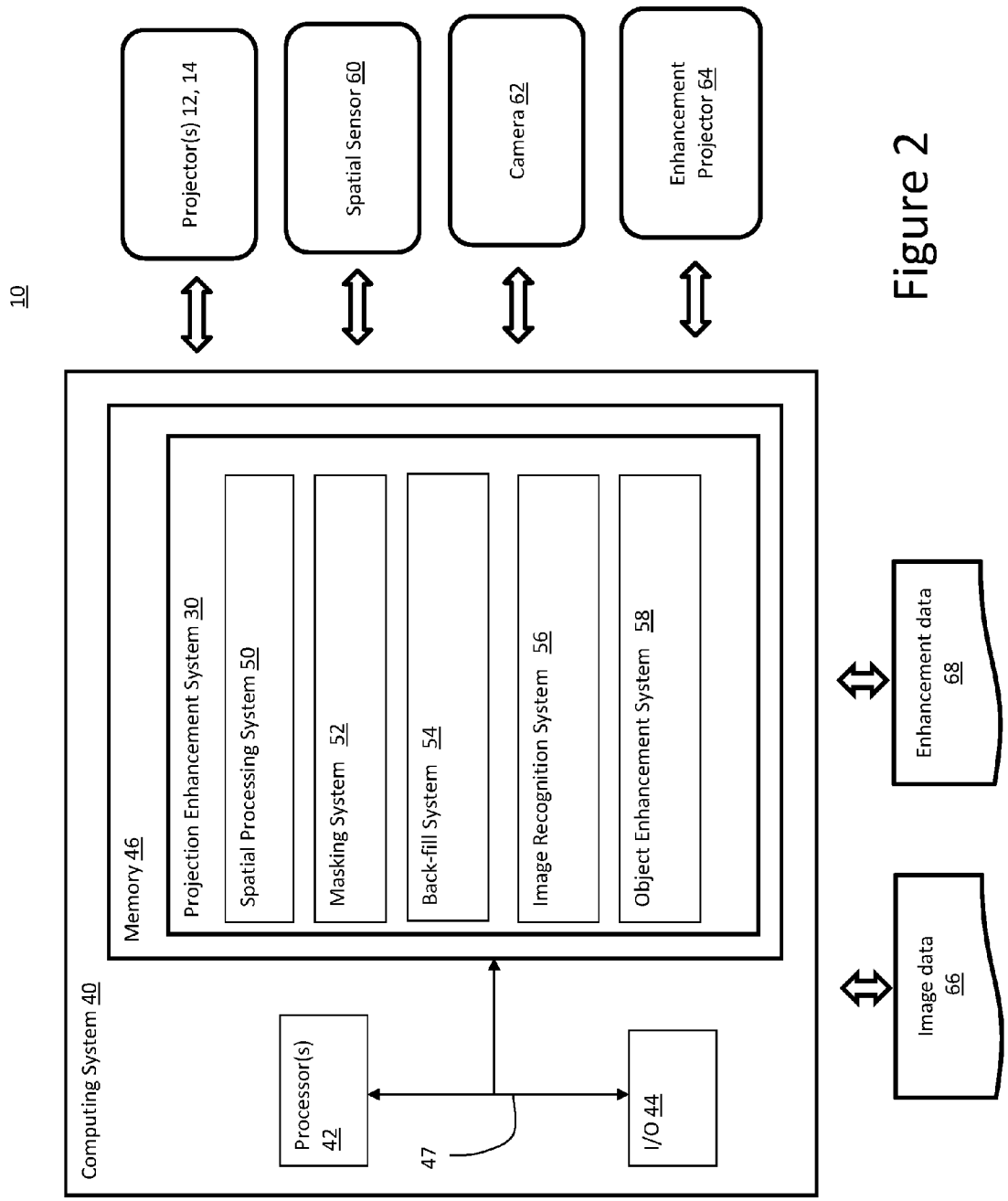
FIG. 2 shows a computing system having a projection enhancement system according to embodiments.

FIG. 2 depicts a computing system 40 having a projection enhancement system 30 that operates in conjunction with projectors 12 and 14 to implement the features described herein. As noted, projector 12 includes all of the standard functionality needed generate digital projections of inputted image data 66 using a light source. In general, projection enhancement system 30 includes a spatial processing system 50 that locates blocking objects passing through the light field 24 based on inputted sensor data from at least one spatial sensor 60. In response to detected blocking objects, masking system 52 alters the digital image information being projected by projector 12 to mask portions of the projection corresponding to located blocking objects.

Also included is an optional back-fill system 54 that determines where a blanked-out region on the screen 20 occurs as a result of the masking operation and determines corresponding "missing" image data that was masked out. Back-fill system 54 also includes a system for transmitting instructions and/or replacement image data to a back-fill projector 14 to cause the back-fill projector to back-fill the blanked-out region on the screen 20 with the replacement image data.

Image recognition system 56 obtains and processes images from camera 62 to extract feature data that can be used to recognize an identity, type, category, details, etc. of the blocking object in the light field 24. For example, in the case of a presenter 16, the blocking object may be recognized generically as a person. Additional feature data may then be used to further determine, e.g., an identity, facial features, body parts, props, etc. Once the image recognition system 56 determines such information, object enhancement system 58 generates a secondary or enhancement projection 28 with enhancement projector 64. The enhancement projector 64 may utilize inputted enhancement data (e.g., stored image data, lighting instructions, etc.) or simply generate a lighting scheme based on a predefined algorithm or table. An illustrative scheme may for example include: (1) if a presenter's face is located, shine a low intensity soft light on it; (2) based on a recognized identity of a person (e.g., main speaker versus assistant) use a predetermined illumination scheme; (3) if a white board prop is identified, show an inputted video clip on it; (4) if a demonstration prop is recognized, shine a high intensity light on it, etc.

Note that the spatial processing system 50 and image recognition system 56 may be integrated into a single system that does both object location and recognition or be maintained separately as shown. Also note that rather than using enhancement projector 64, the projection image, including the mask generated by masking system 52, may be altered to generate the desired enhancement (e.g., the mask may be changed from opaque to translucent), part of the mask may be filtered (e.g., removing higher frequency light waves), and/or enhanced (e.g., generating a blinking light), etc. Thus, a single projector can be used to generate both the primary projection and the enhanced projection, or multiple projectors may be utilized.

Figure 3:
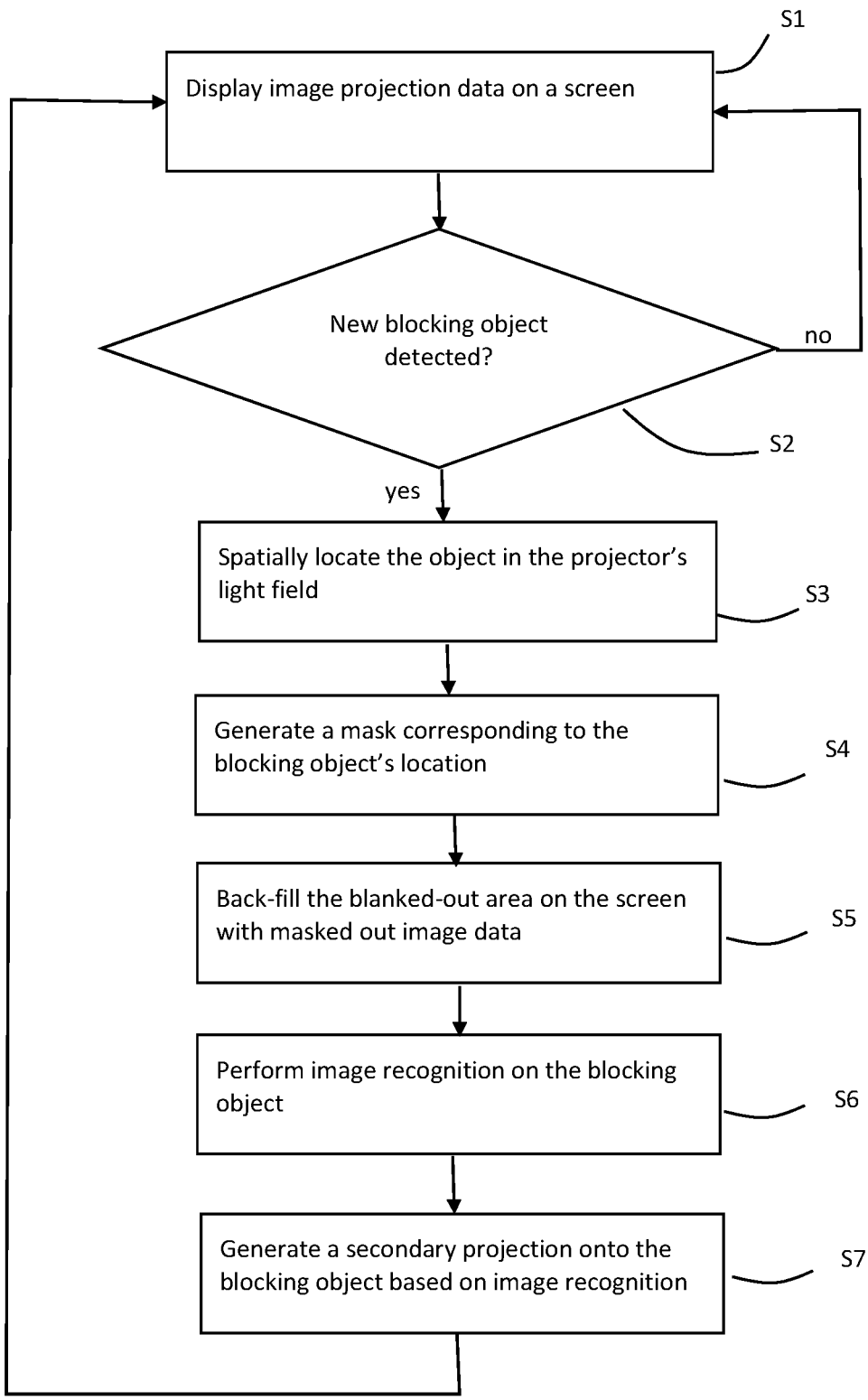
FIG. 3 shows flow diagram of a projection enhancement method according to embodiments.

FIG. 3 depicts a flow diagram showing an illustrative method of implementing projection enhancement. At S1, image projection data is displayed on a screen 20 and at S2 a check is made to determine whether a new (or moving) blocking object is detected. If no, the process loops back to S1. If yes, the blocking object is spatially located within the projector's light field 24 at S3. Location may be captured in a three dimensional x, y, z coordinate space. Once the spatial location information is collected, a mask is generated that corresponds to the size and location of the blocking object at S4, and at S5 the blanked-out area on the screen 20 is optionally back-filled with replacement image data. At S6, image recognition is performed on the blocking object to ascertain feature data about the object that is then used for recognition purposes (e.g., an identity, type, category, etc.), and at S7 a secondary or enhanced projection 28 is generated on some or all of the blocking object based on the image recognition. The process dynamically repeats to identify any new blocking objects or movements of existing blocking objects.

Embodiments may thus include a proximity sensor on a projector that is combined with an image recognition system to dynamically alter the image being projected when someone steps (or a blocking object passes) into the light field 24. This can be used to mask out selectable parts of the projection, e.g., a person's whole body to eliminate a distracting brightly lit passer-by, or just the face in order not to blind a presenter. In addition, part of the projected image can be altered to project white light at a desired/reduced intensity, to give the presenter a visual focus without distraction.

In addition, by using multiple projection sources, the projected image can be displayed from alternative angles around the person or object moving into the light field 24.

Hence the projected image can appear undisturbed and intact whilst the blocking object moves in front of the screen 20.

Further, the image projection enhancements can take advantage of a person or object moving into the light field 24 and use part of the physical entity (person or object) as the project target and adjust the projected image accordingly. For example a person can hold up a smaller screen like a chart in the field of display, upon which a secondary or enhanced projection will display a smaller image that is specifically design to be displayed on a smaller target.

Further application of the projection enhancement include stage or theatre lighting, to provide spotlights that do not cause performers to be blinded by the light coming directly at them. Special effects can also be implemented such as masking out the background and selectively projecting an image onto a portable or moving screen. Along those lines, a person's clothing could be used as a projection surface.

Referring again to FIG. 2, it is understood that projection enhancement system 30 may be implemented as a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 2 depicts an illustrative computing system 10 that may comprise any type of computing device and, and for example includes at least one processor 42, memory 46, an input/output (I/O) 44 (e.g., one or more (I/O) interfaces and/or devices), and a communications pathway 47. In general, processor(s) 42 execute program code which is at least partially fixed in memory 46. While executing program code, processor(s) 42 can process data, which can result in reading and/or writing transformed data from/to memory and/or (I/O) 44 for further processing. The pathway 47 provides a communications link between each of the components in computing system 40. (I/O) 44 can comprise one or more human (I/O) devices, which enable a user to interact with computing system 40.

Furthermore, it is understood that the projection enhancement system 30 or relevant components thereof (such as an API component, agents, etc.) may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will, select the proxy server code, determine on which computers to place the proxy servers' code, transmit the proxy server code, then install the proxy server code on the proxy computer. The components will be transmitted to the proxy server and then it will be stored on the proxy server.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A projection enhancement infrastructure, comprising:
a digital projector for generating an image projection onto a surface;
a spatial sensor configured to sense and locate a blocking object in a light field associated with the digital projector;
a masking system that masks a portion of the image projection corresponding to the blocking object;
an enhancement system that generates an enhancement projection onto the blocking object, the enhancement system including an image recognition system for identifying feature data of the blocking object and for identifying the blocking object based on the feature data, and wherein the enhancement projection includes a predetermined lighting scheme, distinct from the image projection, projected onto the blocking object based on the identity of the blocking object; and
a back-fill projector that generates a back-fill projection at a blanked-out region of the surface caused by a masked portion of the image projection,
wherein the image recognition system, based on the feature data, identifies that the blocking object is a person and determines an identify of the person, and wherein the lighting scheme includes a first type of illumination projected onto a first portion of the person based on the identify of the person and a second, different type of illumination projected onto a second portion of the person based on the identity of the person.

2. The projection enhancement infrastructure of claim 1, wherein the first type of illumination is projected onto a face of the person and the second, different type of illumination is projected onto a body of the person.

3. The projection enhancement infrastructure of claim 1, wherein the enhancement projection comprises secondary image data.

4. A computer program product stored on non-transitory computer readable storage medium, which when executed by a computer system, provides projection enhancement, comprising:
programming instructions configured to analyze input from a spatial sensor to locate a blocking object in a light field associated with an image projection of a digital projector;
programming instructions that mask a portion of the image projection corresponding to the blocking object;
programming instructions that determine an enhancement projection for generation onto the blocking object, including program instructions for identifying feature data of the blocking object and for identifying the blocking object based on the feature data, and wherein the enhancement projection includes a predetermined lighting scheme, distinct from the image projection, projected onto the blocking object based on the identity of the blocking object; and
programming instructions to cause a back-fill projector to generate a back-fill projection at a blanked-out region of a surface caused by a masked portion of the image projection,
wherein the program instructions for identifying the feature data of the blocking object and for identifying the blocking object based on the feature data, identifies that the blocking object is a person and determines an identify of the person, and wherein the lighting scheme includes a first type of illumination projected onto a first portion of the person based on the identify of the person and a second, different type of illumination projected onto a second portion of the person based on the identify of the person.

5. The computer program product of claim 4, wherein the first type of illumination is projected onto a face of the person and the second, different type of illumination is projected onto a body of the person.

6. The computer program product of claim 4, wherein the enhancement projection comprises secondary image data.

7. A method of implementing projection enhancement, comprising:
providing a digital projector for generating an image projection onto a surface from;
utilizing a spatial sensor to sense and locate a blocking object in a light field associated with the digital projector;
masking a portion of the image projection corresponding to the blocking object; and generating an enhancement projection onto the blocking object, the generating an enhancement projection includes identifying feature data of the blocking object and identifying the blocking object based on the feature data, and wherein the enhancement projection includes a predetermined lighting scheme, distinct from the image projection, projected onto the blocking object based on the identity of the blocking object; and providing a back-fill projector to generate a back-fill projection at a blanked-out region of the surface caused by a masked portion of the image projection, wherein the identifying the feature data of the blocking object and identifying the blocking object based on the feature data includes identifying that the blocking object is a person and determining an identify of the person, and wherein the lighting scheme includes a first type of illumination projected onto a first portion of the person based on the identify of the person and a second, different type of illumination projected onto a second portion of the person based on the identify of the person.

8. The method of claim 7, wherein the first type of illumination is projected onto a face of the person and the second, different type of illumination is projected onto a body of the person.

9. The method of claim 7, wherein the enhancement projection comprises secondary image data.

* * * * *